(12) United States Patent  (10) Patent No.: US 8,088,999 B1
Payou  (45) Date of Patent: Jan. 3, 2012

(54) ELECTRICAL PLUG STABILIZING COVER

(76) Inventor: Leon F. Payou, Falher (CA)

(*) Notice: Subject to any disclaimer, the term of this patent is extended or adjusted under 35 U.S.C. 154(b) by 436 days.

(21) Appl. No.: 12/316,447

(22) Filed: Dec. 12, 2008

(51) Int. Cl.
H02G 3/14 (2006.01)
H05K 5/03 (2006.01)

(52) U.S. Cl. ............ 174/67; 174/66; 220/241; 220/242; 439/135; 439/136

(58) Field of Classification Search ........... 174/66, 174/67, 53, 57, 50; 220/241, 242, 3.8; 439/133, 439/135, 136, 147; D13/156, 177
See application file for complete search history.

(56) References Cited

U.S. PATENT DOCUMENTS

| | | | |
|---|---|---|---|
| 2,526,606 A * | 10/1950 | Gregg | 174/67 |
| 3,428,936 A | 2/1969 | Amao, Jr. | |
| 3,656,083 A | 4/1972 | Brook | |
| 4,105,274 A | 8/1978 | Casey | |
| 4,424,407 A | 1/1984 | Barbic | |
| 4,593,541 A * | 6/1986 | Hollis | 174/67 |
| 4,603,931 A | 8/1986 | Ruffman | |
| 4,851,612 A * | 7/1989 | Peckham | 174/67 |
| 4,915,638 A | 4/1990 | Domian | |
| 4,950,842 A | 8/1990 | Menninga | |
| 4,993,963 A * | 2/1991 | Pedigo | 174/67 |
| 5,045,640 A * | 9/1991 | Riceman | 174/67 |
| 5,362,924 A | 11/1994 | Correnti | |
| 5,389,740 A * | 2/1995 | Austin | 174/67 |
| 5,589,665 A | 12/1996 | Scamacca | |
| D381,631 S * | 7/1997 | Hallett et al. | D13/156 |
| 5,779,083 A | 7/1998 | Bordwell | |
| 6,007,353 A | 12/1999 | Webster | |
| 6,133,531 A | 10/2000 | Hayduke et al. | |
| 6,198,046 B1 * | 3/2001 | Moodie | 174/67 |
| 6,309,239 B1 * | 10/2001 | Johnston | 174/67 |
| 6,519,208 B2 * | 2/2003 | DeVries | 174/66 |
| 6,649,838 B1 | 11/2003 | Lopez, Sr. et al. | |
| 6,677,525 B1 | 1/2004 | Walker | |
| 7,097,474 B1 * | 8/2006 | Naylor | 174/67 |
| D531,961 S | 11/2006 | Greenfield | |
| D556,145 S | 11/2007 | Williams et al. | |

* cited by examiner

Primary Examiner — Angel R Estrada

(74) Attorney, Agent, or Firm — Montgomery Patent & Design, LLC; Robert C. Montgomery; Joseph T. Yaksich

(57) ABSTRACT

An electrical outlet plate with a hinged cover to not only cover the outlet openings, but provide a means of safely securing any plug and cord that should be connected to it is herein disclosed. The base cover plate is similar in appearance to a conventional duplex outlet cover plate used in homes, offices, and businesses. The hinged outlet cover is approximately two (2) inches deep with a lockable latch along a side surface and two (2) slots in the face for routing electrical cords, thereby captivating a plug portion inside. Thus, when secured in place, it is impossible to remove the plug and cord without first removing the cover plate. Due to the spring action of the latch, an adult can easily remove the hinging cover by pressing to release; however, it is virtually impossible for a child or toddler to do so.

14 Claims, 3 Drawing Sheets

ELECTRICAL PLUG STABILIZING COVER

RELATED APPLICATIONS

The present invention was first described in a notarized Official Record of Invention on Feb. 14, 2008, that is on file at the offices of Montgomery Patent and Design, LLC, the entire disclosures of which are incorporated herein by reference.

FIELD OF THE INVENTION

The present invention relates generally to an electrical outlet plate and, more particularly, to said electrical outlet plate comprising a hinged cover and a locking latch to not only cover the outlet openings, but provide a means of safely securing any plug and cord that should be connected to it.

BACKGROUND OF THE INVENTION

There are a wide variety of products aimed at providing a safe home environment for children by preventing the accidents and mishaps that occur all too often. Among the many dangers present in any home, the risk of injury or death caused by accidents involving electricity and electrical devices is among the most common. The most common way of protecting children against accidental contact with electrical receptacles is by the use of childproof plastic covers. However, these covers must be removed when an electrical device is plugged in. In this configuration, even the youngest child can remove the plug by simply pulling on the cord. Thus, the electrical outlet becomes exposed, or perhaps, even more dangerously, the energized plug could become exposed should the plug not become fully disengaged. Accordingly, there is a need for a means by which children and infants can be protected from electrocution from electrical outlets without the disadvantages as described above. The development of the device described herein fulfills this need.

An electrical outlet plate with a hinged cover to not only cover the outlet openings, but provide a means of safely securing any plug and cord that should be connected to it is herein disclosed. The base cover plate is similar in appearance to a conventional duplex outlet cover plate used in homes, offices, and businesses. The hinged outlet cover is approximately two (2) inches deep with a lockable latch along a side surface and two (2) slots in the face for routing electrical cords, thereby captivating a plug portion inside. Thus, when secured in place, it is impossible to remove the plug and cord without first removing the cover plate. Due to the spring action of the latch, an adult can easily remove the hinging cover by pressing to release; however, it is virtually impossible for a child or toddler to do so.

There have been attempts in the past to provide safety covers for electrical outlets. U.S. Pat. No. D 556,145 issued to Williams discloses an outlet cover that opens to one (1) side. Unfortunately, this design patent does not appear to be similar in appearance to the disclosed device, nor does this patent appear to disclose an electrical outlet cover that permits electrical cords retained therein to exit the cover through the front panel.

U.S. Pat. No. D 531,961 issued to Greenfield discloses a vertically-mounted, weatherproof electrical receptacle cover assembly that appears to be a box-like structure that mounts over an electrical outlet. Unfortunately, this design patent does not appear to be similar in appearance to the disclosed device, nor does it appear to disclose an electrical cord stabilizing cover that permits electrical cords to be routed through and maintained therein said cover.

U.S. Pat. No. 6,677,525 issued to Walker discloses a removable cover that appears to be permanently mounted above a duplex outlet that permits the cover to be rotated downward to cover an outlet. Unfortunately, this patent does not appear to disclose an outlet cover that permits the passage of electrical cords through the cover when in place, nor does it appear to possess an aperture for the insertion of a locking mechanism.

U.S. Pat. No. 6,649,838 issued to Lopez et al. discloses an electrical outlet that appears to be a hinged cover that opens vertically and permits the insertion of electrical cords through the cover. Unfortunately, this patent does not appear to disclose an electrical cord stabilizing cover that secures electrical cords within the cover box, nor does it appear to comprise a locking aperture that permits the insertion of a locking mechanism.

U.S. Pat. No. 6,133,531 issued to Hayduke discloses a weatherproof outlet cover assembly that comprises a hinged housing that envelopes and coves an outlet. Unfortunately, this patent does not appear to disclose an outlet cover that permits the passage of electrical cords through the cover when in place, nor does it appear to possess an aperture for the insertion of a locking mechanism.

U.S. Pat. No. 6,007,353 issued to Webster discloses an electrical connector enclosure that appears to comprise a mounting base, plate and a housing that appears to open vertically to permit access to the outlet. Unfortunately, this patent does not appear to disclose an electrical cord stabilizing cover that opens to the side of the device, nor does it appear to disclose an outlet cover that permits the passage of electrical cords through the cover.

U.S. Pat. No. 5,779,083 issued to Bordwell appears to disclose an electrical receptacle cover assembly with dual acting spring covers hingedly attached thereto. Unfortunately, this patent does not appear to disclose an outlet cover that permits the passage of electrical cords through the cover when it is not in place, nor does it appear to possess an aperture for the insertion of a locking mechanism.

U.S. Pat. No. 5,589,665 issued to Scamarra discloses a child-resistant electrical outlet cover that appears to comprise a cylindrical cover that mounts over the electrical cord and is twisted into a locking position thereon the outlet cover plate. Unfortunately, this patent does not appear to disclose a rectangular-shaped cover that possesses slots in the cover for the passage of electrical cords therethrough the cover, nor does it appear to possess an aperture for attachment of a locking means such as a keyed or combination lock.

U.S. Pat. No. 5,362,924 issued to Correnti discloses a protective cover for electrical wall sockets comprising a box shaped cover that is hingedly attached to a base plate. Unfortunately, this patent does not appear to disclose an outlet cover that permits the passage of electrical cords through the cover when in place, nor does it appear to possess an aperture for the insertion of a locking mechanism.

U.S. Pat. No. 4,950,842 issued Mennings discloses an electrical outlet safety cover that appears to comprise a base plate with an aperture to the bottom of the apparatus. Unfortunately, this patent does not appear to disclose an electrical outlet cover that permits electrical cords retained therein to exit the cover through the front panel.

U.S. Pat. No. 4,915,638 issued to Domian discloses an enclosure for electrical outlets that appears to comprise a box-like cover that opens on a vertical plane from a base plate member. Unfortunately, this patent does not appear to disclose a rectangular-shaped cover that possesses slots in the cover for the passage of electrical cords therethrough the cover, nor does it appear to possess an aperture for attachment of a locking means such as a keyed or combination lock.

U.S. Pat. No. 4,603,931 issued to Ruffman discloses a device for appliances with electrical AC power cords that appears to comprise an enclosure that is mounted on the front surface of an outlet that possesses lateral apertures to permit the passage of electrical cords. Unfortunately, this patent does not appear to disclose an electrical outlet cover that permits electrical cords retained therein to exit the cover through the front panel.

U.S. Pat. No. 4,424,407 issued to Barbic discloses an electrical outlet safety cover that appears to comprise an outlet cover that is screwed onto a duplex outlet and comprises an aperture located on a lateral edge to permit the passage of an electrical cord. Unfortunately, this patent does not appear to disclose a cover that is hingedly mounted to a base plate and that permits the cover to be rotatably opened, nor does it appear to possess an electrical outlet cover that permits electrical cords retained therein to exit the cover through the front panel.

U.S. Pat. No. 4,105,274 issued to Casey discloses a device for retaining electrical plugs that appears to be an "H"-shaped member that is attached to an outlet cover and inhibits the ability of electrical cords to be withdrawn from the electrical outlet. Unfortunately, this patent does not appear to disclose a rectangular-shaped cover that possesses slots in the cover for the passage of electrical cords therethrough the cover, nor does it appear to possess an aperture for attachment of a locking means such as a keyed or combination lock.

U.S. Pat. No. 3,656,083 issued to Brook discloses an electrical safety device that appears to comprise a faceplate with arcuate outlet apertures. Unfortunately, this patent does not appear to disclose a cover that is hingedly mounted to a base plate and that permits the cover to be rotatably opened, nor does it appear to possess an electrical outlet cover that permits electrical cords retained therein to exit the cover through the front panel.

U.S. Pat. No. 3,428,936 issued to Arnao discloses a cover for an electrical outlet receptacle that appears to comprise a rounded fixture that is attached to an outlet faceplate to prevent the removal of electrical cords from the faceplate. Unfortunately, this patent does not appear to disclose a rectangular-shaped cover that possesses slots in the cover for the passage of electrical cords therethrough the cover, nor does it appear to possess an aperture for attachment of a locking means such as a keyed or combination lock.

None of the prior art particularly describes an electrical outlet plate comprising a hinged cover and a locking latch to not only cover the outlet openings, but provide a means of safely securing any plug and cord that should be connected to it that the instant invention possesses. Accordingly, there exists a need for a means by which children and infants can be protected from electrocution from electrical outlets that operates without the disadvantages as described above.

SUMMARY OF THE INVENTION

In light of the disadvantages as described above in the prior art, it is apparent that there is a need for an electrical plug stabilizing cover comprising a hinged enclosure to safely cover outlet openings and provide means of securing affixed electrical appliance cords.

An object of the electrical plug stabilizing cover comprises a flat rectangular baseplate which is similar in appearance to a conventional duplex outlet cover plate commonly used in homes, offices, businesses, and the like.

Another object of the electrical plug stabilizing cover comprises a hinged box-like enclosure having a front panel comprising two (2) centrally located cover grooves, and a lockable latch.

A further object of the electrical plug stabilizing cover comprises at least one (1) electrical cord that may be plugged into the outlets and routed through the two (2) cover grooves in such a manner that when the cover is secured in place, it is impossible to remove said electrical cords without unlatching the cover.

Still another object of the electrical plug stabilizing cover provides a cover assembly, baseplate assembly, and hinge made using plastic or metal materials fabricated using processes such as plastic injection molding or metal forming and joining.

Still a further object of the electrical plug stabilizing cover provides a variety of decorative colors and patterns based upon a consumer's preferences.

Yet another object of the electrical plug stabilizing cover permits installation of an alternate lock through the locking aperture portion of the latch plate, thereby providing a secured and locked closure means to the cover assembly.

An aspect of the electrical plug stabilizing cover comprises a cover assembly, a flat rectangular baseplate assembly hingedly attached to one another by a hinge.

Another aspect of the electrical plug stabilizing cover comprises a cover assembly further comprising a five (5) sided rectangular pivoting and latching enclosure which provides a captivating means to at least one (1) electrical cord inserted into an electrical duplex outlet.

A further aspect of the electrical plug stabilizing cover comprises a front cover panel comprising a pair of cover grooves and a latch slot. The cover grooves comprise horizontal laterally extending openings in the cover front panel. Each cover groove intersects with a respective circular cover opening located centrally upon said cover front panel.

Still another aspect of the electrical plug stabilizing cover comprises a baseplate assembly providing a replacement means to a conventional duplex outlet cover plate and comprising enhancements including a hingedly attaching means for the cover assembly and a lockable latching mechanism.

Another aspect of the electrical plug stabilizing cover comprises a latch plate comprising a flat rectangular form allowing deflection when depressed laterally by a user to unlatch.

Still a further aspect of the electrical plug stabilizing cover comprises a hinge comprising a common multi-element pivoting device mounted in a vertical orientation and affixed jointly along side surfaces to the baseplate hinge plate and the first cover side panel.

Yet another aspect of the electrical plug stabilizing cover comprises a latch slot enabling release of the cover assembly from the latch plate and comprising a centrally located locking aperture further comprising a drilled hole so as to provide a point of insertion for a key or combination type locking mechanism.

Yet still another aspect of the electrical plug stabilizing cover comprises a latch plate that provides a means to secure the cover assembly to the baseplate assembly by latching protrusion portion.

A method of utilizing the device may be achieved by performing the following steps: selecting one (1) or more existing duplex outlets on which to utilize the device based upon child safety needs and/or specific needs for appliance security; removing an existing outlet cover plate from the existing outlet; installing the device to the existing duplex outlet using the provided fastener; inserting a plug portion of at least one (1) electrical cord into the outlets as needed; rotating the cover assembly about the hinge while routing said cord through the cover grooves and cover openings; continuing to rotate the cover assembly until contacting the baseplate assembly and coincidentally engaging the latching protrusion to secure said cover assembly in a closed position; adding an optional key or combination lock if a greater level of security is desired; opening the device for removal or addition of the cord by removing the lock from the locking aperture, if so equipped; depressing laterally the latch plate to disengage the latching protrusion; pivoting the cover assembly about the hinge to expose the outlets; and, benefiting from effectively child-proofing an electrical outlet and securing particular electrical appliances to duplex outlets utilizing the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | electrical plug stabilizing cover |
| 20 | cover assembly |
| 21 | cover front panel |
| 22 | first cover side panel |
| 23 | cover top panel |
| 24 | cover groove |
| 25 | cover opening |
| 26 | latch slot |
| 27 | cover bottom panel |
| 28 | second cover side panel |
| 30 | baseplate assembly |
| 31 | baseplate |
| 32 | baseplate hinge plate |
| 33 | hinge |
| 34 | latch plate |
| 35 | locking aperture |
| 36 | outlet aperture |
| 37 | latching protrusion |
| 38 | fastener |
| 100 | cord |
| 110 | duplex outlet |
| 120 | lock |
| 130 | wall surface |

DETAILED DESCRIPTION OF THE PREFERRED EMBODIMENT

Figure 1:
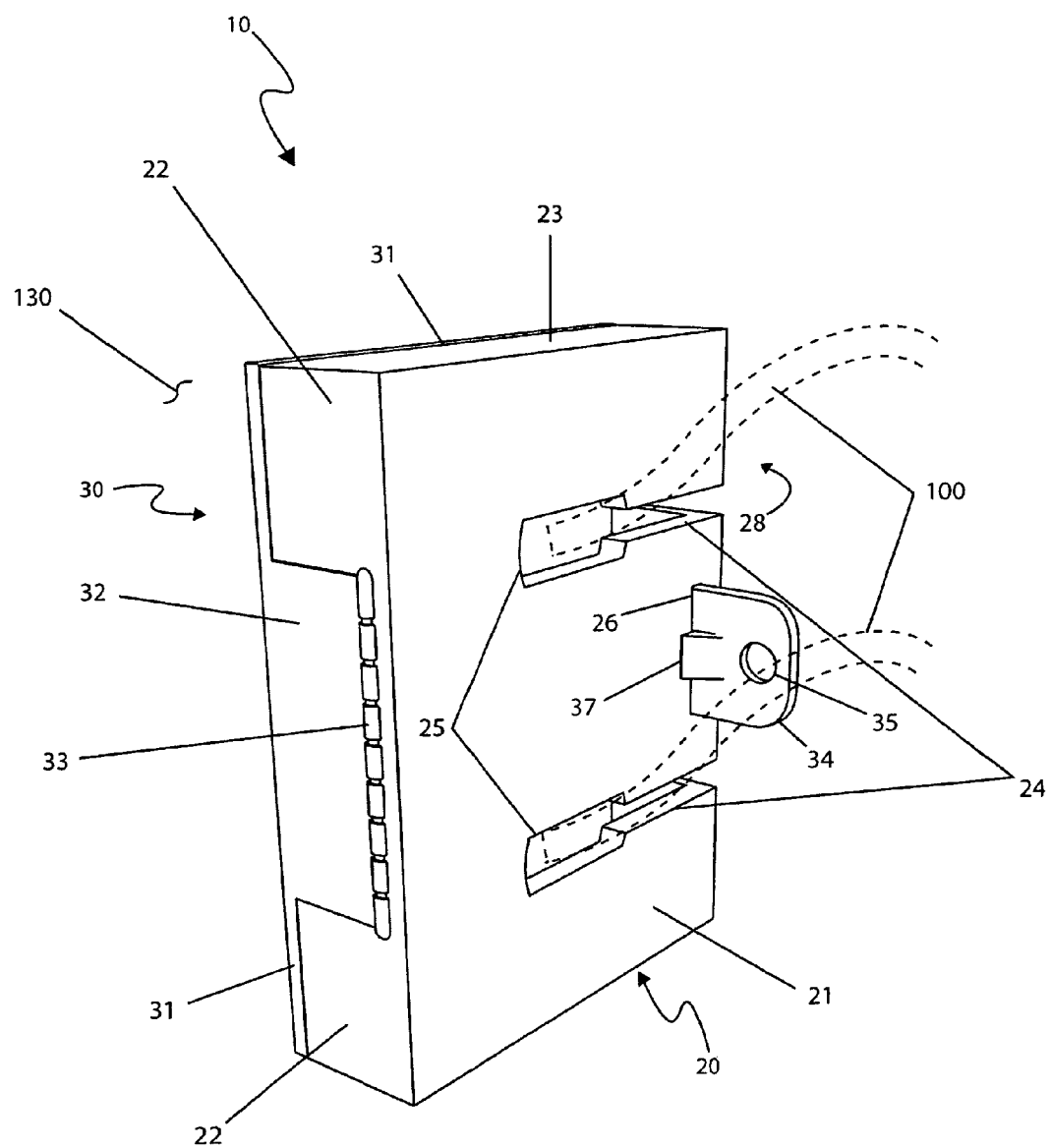
FIG. 1 is a front perspective view of an electrical plug stabilizing cover 10 depicting a closed state, according to a preferred embodiment of the present invention.
Figure 2:
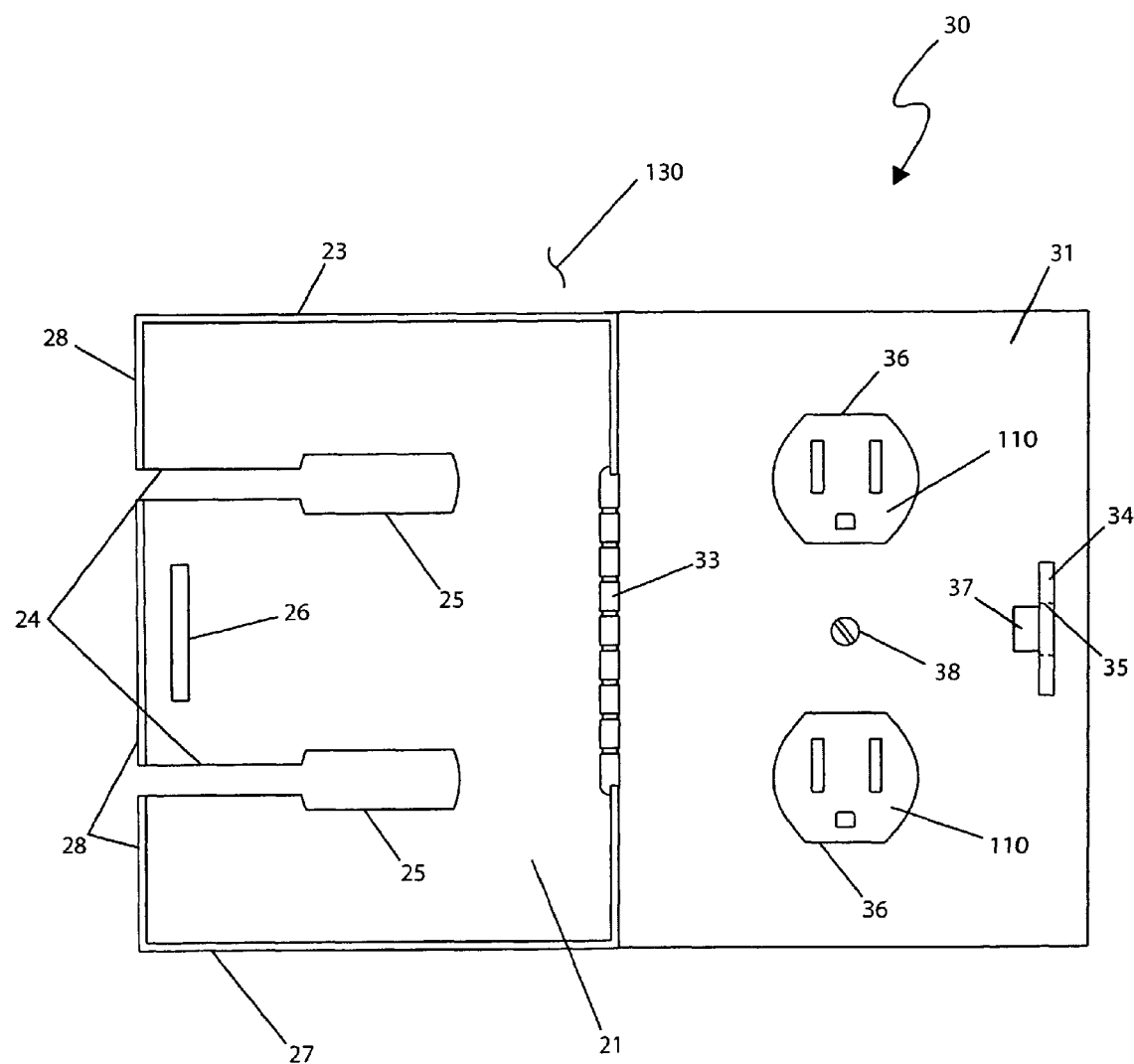
FIG. 2 is a front perspective view of an electrical plug stabilizing cover 10 depicting an open state, according to a preferred embodiment of the present invention; and, FIG. 3 is a side view of an electrical plug stabilizing cover 10, according to a preferred embodiment of the present invention.
Figure 3:
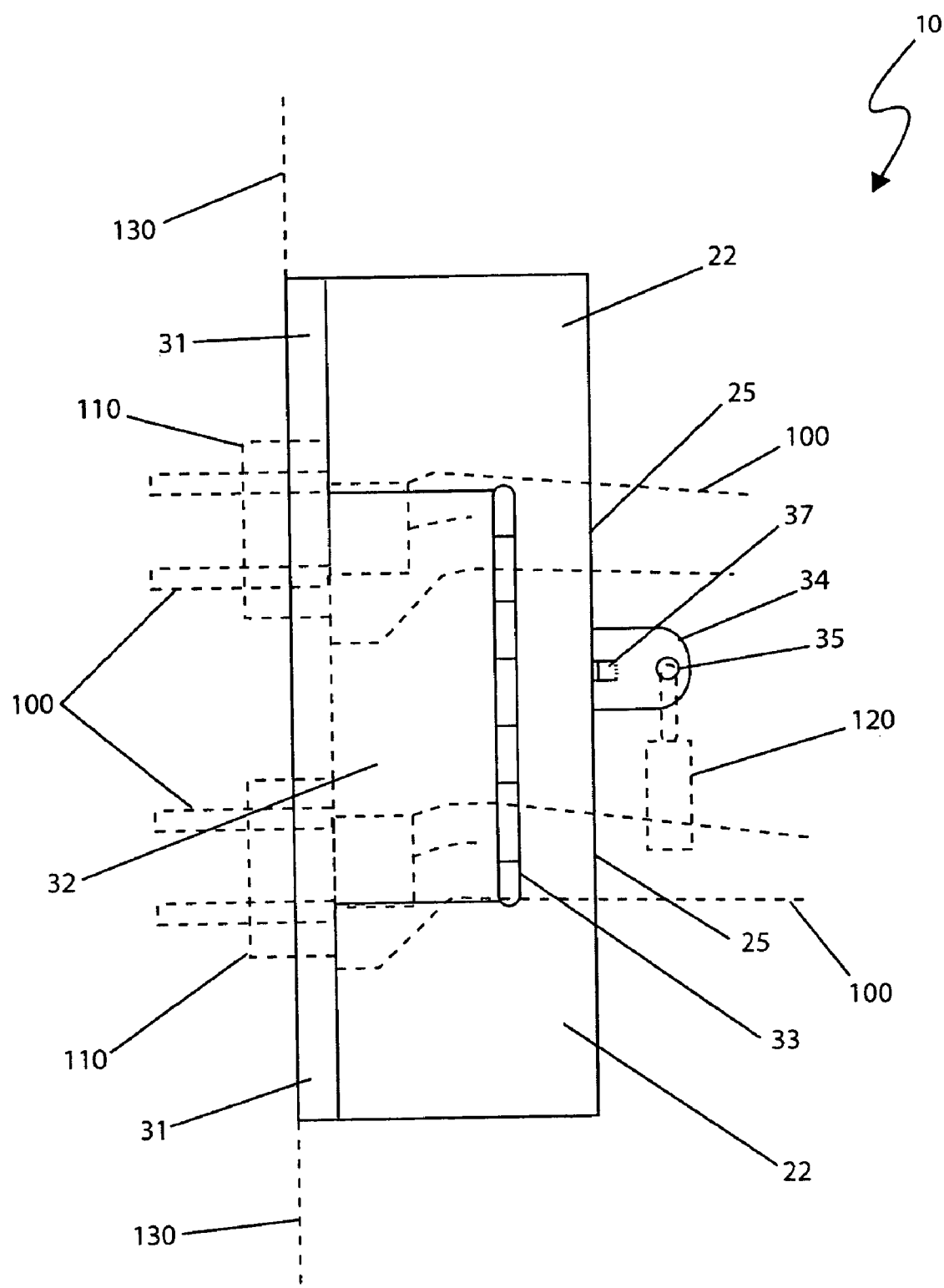

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an electrical plug stabilizing cover (herein described as the "device") 10, comprising a hinged enclosure to safely cover outlet openings 110 as well as providing a means of securing affixed electrical appliance cords 100 thereto. The device 10 comprises a flat rectangular baseplate 31 which is similar in appearance to a conventional duplex outlet cover plate used to cover conventional 120VAC, NEMA 5-15R receptacles 110 commonly used in homes, offices, businesses, and the like. However, the device 10 is also equipped with a hinged box-like enclosure having a front panel 21 comprising two (2) centrally located cover grooves 24, and a lockable latch 34. Electrical cords 100 may be plugged thereinto the outlets 110 and routed therethrough the two (2) cover grooves 24 thus, when secured in place, it is impossible to remove said cords 100 without first unlatching and swinging the cover 20 to the side.

Referring now to FIG. 1, a front perspective view of the device 10 depicting a closed state, according to the preferred embodiment of the present invention, is disclosed. The device 10 comprises a cover assembly 20 and a baseplate assembly 30 being hingedly attached thereto one another via a hinge 33. The cover assembly 20, baseplate assembly 30, and hinge 33 are envisioned being made using plastic or metal materials fabricated using processes such as plastic injection molding or metal forming and joining. Furthermore, the device 10 is envisioned being introduced in a variety of decorative colors and patterns based upon a consumer's preferences. The cover assembly 20 comprises a 5-sided rectangular pivoting and latching enclosure approximately two (2) inches deep being made using molded plastic or formed metal and provides a captivating means thereto cords 110 being inserted therein an electrical duplex outlet 110. The cover assembly 20 further comprises a cover front panel 21, a first cover side panel 22, a cover top panel 23, a cover bottom panel 27, and a second cover side panel 28. The baseplate assembly 30 provides a replacement means thereto a conventional duplex outlet cover plate and comprises enhancements including a hingedly attaching means for the aforementioned cover assembly 20, and a lockable latching mechanism 34 therebetween (see FIG. 2). The baseplate assembly 30 comprises a baseplate 31, a baseplate hinge plate 32, and a latch plate 34.

The hinge 33 comprises a common multi-element pivoting device approximately three (3) inches long being mounted in a vertical orientation and affixed jointly along side surfaces thereto the baseplate hinge plate portion 32 of the baseplate assembly 30 and the first cover side panel portion 22 of the cover assembly 20. The hinge 33 is envisioned being affixed thereto the first cover side panel 22 and corresponding baseplate hinge plate 32 using methods such as injection molding, welding, soldering, fasteners, or the like. The hinge 33 is located at an offset position with regards thereto the baseplate 30 via the integral baseplate hinge plate 32 which extends at a right angle therefrom the baseplate portion 31 so as to allow said cover assembly 20 to swing a full one-hundred-eighty degrees) (180° of rotation. The front cover panel 21 further comprises a pair of cover grooves 24 and a latch slot 26. The cover grooves 24 comprise horizontal laterally extending openings therein the cover front panel 21 being approximately one-quarter (¼) inch wide. Each cover groove 24 intersects therewith a respective circular cover opening 25 being approximately one-half (½) inch in diameter and located centrally thereupon said cover front panel 21. Said cover groove 24 extends therefrom said cover opening 25 and wraps around an edge portion thereof and continues along the second cover side panel 28 (see FIG. 2). The latch slot 26 is located along an edge portion of the cover front panel 21 opposite the hinge 33 location and comprises a rectangular opening approximately one (1) inch tall being sized so as to slidingly receive the latch plate portion 34 of the baseplate assembly 30 (see FIG. 2). The latch plate 34 provides a means to secure the cover assembly 20 thereto the baseplate assembly 30 via a latching protrusion portion 37. The latching protrusion 37 is integral thereto and extends angularly therefrom a side surface of the latch plate 34. The latching protrusion 37 provides mechanical engagement therewith the latch slot portion 26 of the cover front panel 21 to secure said cover assembly thereagainst the baseplate assembly 30 as shown in FIG. 1. The width of the latch slot 26 enables release of the cover assembly 20 therefrom the latch plate 34 by pressing and deflecting said latch plate portion 34 laterally to disengage the latching protrusion 37. The latch plate 34 further comprises a centrally located locking aperture 35 further comprising a drilled hole so as to utilize a key or combination type lock 120 being inserted therethrough (see FIG. 3).

Referring now to FIG. 2, a front perspective view of the device 10 depicting an open state, according to the preferred embodiment of the present invention, is disclosed. In use, the baseplate assembly 30 is affixed thereto a wall surface 130 via an existing duplex outlet 110 therewithin an electrical box using a common fastener 38 in a conventional manner. The baseplate 31 is envisioned to comprise approximate rectangular dimensions as a conventional outlet cover. The baseplate assembly 30 comprises a baseplate 31 and a latch plate 34. The latch plate 34 extends therefrom the baseplate 31 at a right angle being permanently affixed thereto via integral molding thereto or, in the event metal materials are utilized, said latch plate 34 is envisioned being welded or soldered thereto. The latch plate 34 comprises a flat rectangular form approximately one (1) inch wide, two and one-half (2½) inches long, and one-eighth (⅛) inch thick, thereby allowing deflection when depressed laterally by a user to unlatch. The baseplate 31 provides a pair of duplex outlet apertures 36 being arranged and sized in accordance with established electrical standards for conventional 120VAC, NEMA 5-15R receptacles.

Referring now to FIG. 3, a side view of the device 10, according to the preferred embodiment of the present invention, is disclosed. The device 10 is illustrated here in a closed and secure state showing insertion of a pair of cords 100 therein the duplex outlets 110 and extending therethrough the cover opening portions 25. The device 10 further depicts installation of an alternate lock 120 therethrough the locking aperture 35 portion of the latch plate 34, thereby providing a secured and locked closure means thereto the cover assembly 20.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: selecting one (1) or more existing duplex outlets 110 on which to utilize the device 10 based upon child safety needs and/or specific needs for appliance security; removing an existing outlet cover plate therefrom the existing outlet 110; installing the device 10 thereto the existing duplex outlet 110 using the provided fastener 38; inserting one (1) or two (2) plug portions of electrical cords 100 thereinto the outlets 110 as needed; rotating the cover assembly 20 about the hinge 33 while routing said cords 100 therethrough the cover grooves 24 and cover openings 25; continuing to rotate the cover assembly 20 until contacting the baseplate assembly 30, thereby coincidentally engaging the latching protrusion 37 to secure said cover assembly 20 in a closed position; adding an optional key or combination lock 120 if a greater level of security is desired; opening the device 10 for removal or addition of cords 100 by removing the lock 120 therefrom the locking aperture 35, if so equipped; depressing laterally the latch plate 34 to disengage the latching protrusion 37; pivoting the cover assembly 20 thereabout the hinge 33 to expose the outlets 110; and, benefiting from effective child-proofing of an electrical outlet 110 as well as securing particular electrical appliances thereto duplex outlets 110 using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An electrical plug stabilizing cover, comprising:
    a generally flat baseplate having at least two outlet apertures, said baseplate being attachable to and covering an electrical outlet such that said at least two outlet apertures align with electrical receptacles;
    a hinge plate extending outward perpendicularly from an edge portion of said baseplate;
    a cover assembly having at least two cover openings to receive at least one electrical cord, said cover assembly being hingedly connected to a forward edge of said hinge plate such that said cover assembly is pivotable between an open position exposing said electrical receptacles and a closed position covering said electrical receptacles;
    a latch slot disposed on an edge portion of said cover assembly opposite said hinge plate; and,
    a latch plate extending outward perpendicularly from an edge portion of said baseplate opposite said hinge plate insertable through said latch slot to secure said cover assembly in said closed position;
    wherein said cover assembly prevents said at least one electrical cord connected into said electrical receptacles from being removed when in said closed position and wherein said cover assembly allows said at least one electrical cord to be removed from said electrical receptacles when in said open position.

2. The cover of claim 1, wherein said baseplate is affixed to said electrical outlet by at least one fastener.

3. The cover of claim 2, wherein said latch plate further comprises a generally flat semi-flexible member having a latching protrusion disposed on an upper side surface.

4. The cover of claim 3, wherein said baseplate further comprises a first outlet aperture and a second outlet aperture disposed completely therethrough.

5. The cover of claim 4, wherein said cover assembly further comprises:
   a generally rectangular cover front panel;
   a first cover side panel;
   a second cover side panel opposite said first cover side panel hingedly connected to said hinge plate forward edge, said second cover side panel having a central recess to mate with said hinge plate;
   a cover top panel; and
   a cover bottom panel opposite said cover top panel;
   wherein said cover front panel, said first cover side panel, said cover top panel, said cover bottom panel, and said second cover side panel form a five-sided rectangular enclosure defining a hollow interior region between said baseplate and said cover top panel when in said closed position.

6. The cover of claim 5, wherein said at least two cover openings further comprise:
   a first cover opening disposed through said cover front panel aligned with one of said at least two outlet apertures;
   a second cover opening disposed through said cover front panel aligned with a second one of said at lease two outlet apertures;
   a first cover groove extending laterally from said first cover opening to an edge of said first cover side panel; and,
   a second cover groove extending laterally from said second cover opening to an edge of said first cover side panel;
   wherein said at least one electrical cord is routed through a selected cover groove and positioned within a selected cover opening such that a plug of said electrical cord is disposed within said hollow interior region for electrical connection with said electrical receptacles.

7. The cover of claim 6, wherein said latching protrusion further comprises a generally wedge shaped member having a flat bottom surface to mechanically engage a top surface of said cover front panel when said latch plate is fully inserted through said latch slot when in said closed position.

8. The cover of claim 7, wherein said latch plate further comprises a locking aperture, thereby allowing a locking means to be inserted therethrough to secure said cover assembly in said closed position.

9. The cover of claim 1, wherein said each of at least two cover openings further comprises:
   a cover opening disposed through a front panel of said cover assembly aligned with one of said at least two outlet apertures; and,
   a cover groove extending laterally from said cover opening to a perimeter edge of said cover assembly;
   wherein said at least one electrical cord is routed through said cover groove and is positioned within said cover opening such that a plug of said electrical cord is disposed within a hollow interior region between said cover assembly and said baseplate for electrical connection with said electrical receptacles.

10. The cover of claim 3, wherein said latching protrusion further comprises a generally wedge shaped member having a flat bottom surface to mechanically engage a top surface of said cover front panel when said latch plate is fully inserted through said latch slot when in said closed position.

11. The cover of claim 10, wherein said latch plate further comprises a locking aperture, thereby allowing a locking means to be inserted therethrough to secure said cover assembly in said closed position.

12. The cover of claim 11, wherein said each of at least two cover openings further comprises:
   a cover opening disposed through a front panel of said cover assembly aligned with one of said at least two outlet apertures; and,
   a cover groove extending laterally from said cover opening to a perimeter edge of said cover assembly;
   wherein said at least one electrical cord is routed through said cover groove and is positioned within said cover opening such that a plug of said electrical cord is disposed within a hollow interior region between said cover assembly and said baseplate for electrical connection with said electrical receptacles.

13. A method of securely retaining at least one electrical cord in electrical connection with an electrical receptacle, said method comprising the steps of:
   providing an electrical plug stabilizing cover comprising a generally flat baseplate having at least two outlet apertures, said baseplate being attachable to and covering an electrical outlet such that said at least two outlet apertures align with electrical receptacles, a hinge plate extending outward perpendicularly from an edge portion of said baseplate, a cover assembly having at least two cover openings to receive said at least one electrical cord said cover assembly being hingedly connected to a forward edge of said hinge plate such that said cover assembly is pivotable between an open position exposing said electrical receptacles and a closed position covering said electrical receptacles, a latch slot disposed on an edge portion of said cover assembly opposite said hinge plate, and a latch plate extending outward perpendicularly from an edge portion of said baseplate opposite said hinge plate insertable through said latch slot to secure said cover assembly in said closed position;
   attaching said electrical plug stabilizing cover to a selected electrical outlet;
   pivoting said cover assembly to said open position;
   inserting a plug portion of said at least one electrical cord into said electrical receptacle;
   routing a cord portion of said at least one electrical cord through one of said at least two cover openings;
   pivoting said cover assembly to said closed position such that said latch plate is coincidentally inserted through said latch slot; and,
   engaging a latching protrusion to an exterior surface of said cover assembly to secure said cover assembly in said closed position.

14. The method of claim 13, further comprising the steps of:
   providing said latch plate having a locking aperture disposed therethrough to insertingly receive a locking mechanism;
   providing said locking mechanism; and,
   inserting said locking mechanism through said locking aperture to lockingly secure said cover assembly in said closed position to prevent unauthorized access to said electrical outlet.

* * * * *